April 23, 1935. J. F. McCANN 1,998,682
HOUSING AND LUBRICATING MEANS FOR CHAINS
Filed Oct. 16, 1934
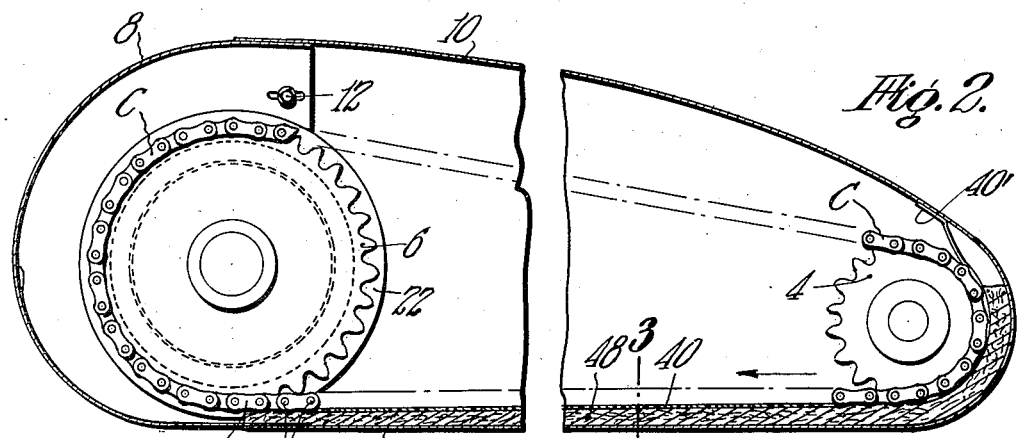
INVENTOR.
John F. McCann.
BY Walter C. Ross
ATTORNEY.

Patented Apr. 23, 1935

1,998,682

UNITED STATES PATENT OFFICE 1,998,682

HOUSING AND LUBRICATING MEANS FOR CHAINS

John F. McCann, Springfield, Mass.

Application October 16, 1934, Serial No. 748,491

6 Claims. (Cl. 184—15)

This invention relates to improvements in chain drives and is directed more particularly to improvements in housing and lubricating means for drive chains.

The principal objects of the invention of this application are directed to the provision of novel means for housing and for lubricating driving chains such as are employed in connection with driving and driven sprocket members.

While the invention will be described hereinafter in connection with the chain of a motorcycle, it will be understood that the novel features thereof are adapted for use in connection with endless chains and sprockets in general.

To facilitate a clear understanding of the novel features of the invention it is desired to point out that chains such as used on motorcycles and the like are usually exposed, so that excessive wear takes place resulting in excessive elongation of the chain which is decidedly objectionable. This is because dust, grit and other abrasive substances find their way into the chain joints and cause stiffness which results in the excessive wear mentioned.

Lubricants of all kinds have been applied to exposed chains but the lubricating material is not only quickly thrown off but it tends to collect dust, dirt, and grit, etc., which works into the chain joints.

Attempts have hitherto been made to lubricate driving chains by housing them in casings containing a bath of lubricant, but these attempts have not been satisfactory for the reason that the chain tends to throw off the lubricant while the housings are not only prone to leak but must be made unnecessarily large and of such shape as to accommodate the slack run of the chain which results in unsightly housings.

According to one feature of this invention, there is provided means for lubricating a chain which includes a perforated wiping strip on which a considerable portion of the chain, such as the slack run, may slide. The said strip is superposed on a member, such as a fibrous pad, which is more or less yieldable and capable of containing lubricant.

The action of the chain in operation is such that its centrifugal force moment causes it to press more or less on the wiping strip or by suction or capillary action causes the lubricant to ooze through the perforations of the strip. In this way the lubricant works into the parts of the chain such as the pins, bushings, rollers and links whereby wear of the chain is reduced, elongation is substantially eliminated and the chain is serviceable over a much longer period of time than is now possible.

As another feature of the invention, the chain and lubricating means may be enclosed in a housing not only to protect the chain but a part of the housing serves to support the lubricating means disposed adjacent the slack run of the chain in such a way that the chain is supported in a straight line substantially tangential to the sprockets supporting it. In this way the chain it not only held against jumping off the sprockets but the housing for that reason may be of minimum size and pleasing in appearance.

Various novel features and advantages of the invention will be hereinafter more fully referred to in connection with the accompanying description of the preferred form thereof, reference being had to the accompanying drawing wherein:

Fig. 1 is a small scale, more or less diagrammatic, elevational view of a motorcycle having the novel features of the invention associated therewith;

Fig. 2 is a longitudinal sectional elevational view through a housing for a chain drive having the lubricating means of the invention associated therewith;

Fig. 3 is a sectional elevational view at an enlarged scale taken on the line 3—3 of Fig. 2;

Fig. 4 is a longitudinal sectional elevational view through the lubricating means shown in Fig. 3;

Fig. 5 is a plan view of a section of the chain-engaging or wiping member of the lubricating device; and Fig. 6 is a sectional plan view taken through the rear part of the housing shown in Fig. 1.

Referring now to the drawing more in detail, the invention will be fully described.

As previously stated, the invention will be described in connection with the chain drive of a motorcycle but it will be readily appreciated that the invention is adapted for broad application and that the description thereof in connection with a motorcycle is for purposes of disclosure.

In Fig. 1 there is shown, more or less diagrammatically, a motorcycle M, having a power plant represented by P. The rear wheel 2 of the motorcycle is usually the driving wheel and, as is common practice, this wheel is driven from the power shaft by means of a chain and sprockets associated with the said wheel and power shaft.

A housing or casing enclosing the chain and sprockets referred to is indicated generally by H and is shown at a larger scale and in section in Fig. 2.

A sprocket 4 which may be referred to as the driving sprocket and shown in Fig. 2 is the one associated with the power plant while a sprocket 6 which may be the driven sprocket is the one associated with the rear wheel. An endless driving chain C passes around and engages the teeth of the sprockets 4 and 6 so that the sprocket 6 and the wheel 2 are propelled by the chain and driver.

The housing H may consist of a forward section 10 and a rear section 8 which are arranged for telescopic action so that the rear section may be moved forward and back relative to the other section 10. Slots may be provided in a wall or walls of the housing sections through which clamp bolts or screws 12 extend for clamping the housing sections together.

With drives for motorcycles it is often necessary to adjust the rear wheel by moving it back and forth. Also with drives of this type in connection with other driving and driven units it is necessary to move the units relative to one another. For these reasons with the drive chain and sprockets enclosed in a housing it is desirable that the housing be adjustable. In this case the adjustment of the housing is accomplished by moving the one section of the housing back and forth relative to the other section.

A seal 18 is provided around the hub 20 of the sprocket 6 which may take the form of a ring. This is preferably of yieldable or resilient material and is held in place by a retaining ring such as 22 which may be associated with the housing.

The chain C is shown as consisting of a plurality of pivoted together links 30, and driving elements 32 which engage between the teeth of the sprockets. The driving elements may be rollers or bushings or whatever may be desired but in any case the pivotal connections such as rivets or pins 34 with rollers or bushings and links are continually working one on the other in the operation of the drive so that unless adequately lubricated appreciable wear results. A very small amount of wear of each chain joint, when multiplied by the number of joints in the chain, seriously impairs the chain because it becomes elongated in its total length very appreciably.

By housing the drive, as described, the chain is not subjected to the abrasive action of dirt, grit, dust and abrasives of all kinds which tend to cause stiffening of the chain joints and the consequent wear, while the housing is adapted to serve as a support for the chain lubricating means now to be described.

A wiping strip 40 is provided which is preferably of some flexible material such as a thin metallic strip. This strip is held in position by having a portion thereof such as an end 40' secured to the housing.

This strip 40 is preferably of such a width that it contacts with the rollers or bushings 32 of the chain between the links, and is not necessarily in contact with the links. The strip may extend partly around one of the sprockets such as the driving sprocket 4 and along the chain to a point adjacent the other sprocket and it is perforated as at 42.

A pad 48 is disposed behind or beneath the strip 40 and preferably consists of some relatively yieldable material capable of containing lubricant. For instance, the pad 48 may be of fibrous material such as felt or the like which will give up the lubricant contained therein when the strip 40 is urged thereagainst.

The strip 40 and pad will preferably extend along the slack run of the chain as distinguished from the tight or driving run.

In operation, as the run of the chain slides along the strip, it bears more or less thereon to press the strip against the pad. The action is such that lubricant oozes from the pad and through the perforations of the strip and onto the chain. In this way lubricant is supplied the pivotal connections, bushings and other working parts of the chain continuously during the operations thereof.

In such a chain drive as is illustrated the lower run, which is the slack run, tends to bulge outwardly between the sprockets. This bulging of the chain often results in the chain's jumping a tooth or teeth of the sprockets but, according to this invention, the housing is formed to support the lubricating means to prevent the chain from bulging out. In fact, as is illustrated, the lower run of the chain is held in a substantial straight line which is tangential to the sprockets so that any tendency of the chain to bulge causes it to press on the strip 40 whereby the most efficient lubricating effects may be obtained.

As before stated, the invention may be used in connection with chains and sprocket drives of various types. It is however particularly adapted for use in connection with motorcycles where the chain is ordinarily exposed and therefore subjected to very severe conditions in that it collects grit, dirt, dust and abrasives of all kinds which tend to bring about stiffness of the chain joints and the consequent wear and resulting elongation.

As an example of the utility of the lubricating means of the invention, it is desired to refer to these facts. A motorcycle, having a drive such as described, was operated with a lubricating device of the invention associated with the chain over a period of 400 hours during which period the chain was adequately lubricated. The total elongation of the chain during this 400 hour period was no more than .020 inch. Then the lubricating mechanism was removed to expose the chain and it was subjected to the same operating conditions for a period of 40 hours. During this 40 hour period and without lubricant, the total elongation of the chain became .539 inch, an increase of .519 inch during the 400 hours of operation referred to.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. Lubricating means for lubricating a driving chain comprising in combination, a relatively rigid support, a pad of yieldable fibrous material thereon for containing lubricant, and a perforated relatively flexible strip on said pad along which a chain may slide whereby lubricant is supplied said chain.

2. Lubricating means for a chain engaging driving and driven sprockets comprising in combination, a relatively rigid support, a pad of yieldable material adapted to contain lubricant and a strip of perforated metal adapted to be engaged by a run of the chain, the said strip being yieldable to press on said pad whereby lubricant is caused to pass through the perforations thereof onto said chain.

3. The combination of an endless chain and sprockets with lubricating means therefor comprising, a relatively flexible perforated strip extending along a run of said chain over one side of which said chain slides and a yieldable member capable of containing lubricant on the opposite side of said strip adapted to supply lubricant to the chain through the perforations of said strip.

4. The combination of an endless chain and sprockets with lubricating means therefor comprising, a relatively flexible perforated strip extending along a run of said chain having a side over which said chain slides, a yieldable member of fibrous material capable of containing lubricant at the other side of said strip and a relatively rigid support for said yieldable member at the side thereof remote from said strip.

5. The combination with an endless chain and spaced sprockets of a motorcycle of, a support extending along a run of said chain, a pad of yieldable material capable of containing lubricant on said support and a relatively flexible strip of perforated metal on said pad on which said run of the chain slides.

6. The combination of an endless chain and spaced sprockets of a motorcycle with, a housing enclosing said chain and sprockets having a supporting part for lubricating means, a pad of lubricant absorbing material on said supporting part, and a strip of perforated metal on said pad along which the said chain slides, the said strip being depressible by said chain to cause lubricant therein to pass through the perforations thereof into said chain.

JOHN F. McCANN.